United States Patent [19]

Dubois et al.

[11] 4,410,283
[45] Oct. 18, 1983

[54] CHOLESTERIC LIQUID CRYSTAL OF THE REENTRANT TYPE AND A TEMPERATURE-DETECTING DEVICE ENTAILING THE USE OF A LIQUID CRYSTAL OF THIS TYPE

[75] Inventors: Jean-Claude Dubois; Jean Billard; Annie Zann, all of Paris, France

[73] Assignee: Thomson-CSF, Paris, France

[21] Appl. No.: 296,302

[22] Filed: Aug. 26, 1981

[30] Foreign Application Priority Data

Aug. 29, 1980 [FR] France ............... 80 18774

[51] Int. Cl.³ .............. C09K 3/34; G01K 11/12
[52] U.S. Cl. .................. 374/162; 116/216; 116/217; 252/299.01; 252/299.64; 252/299.65; 252/299.7; 374/160; 374/161
[58] Field of Search ........... 252/299.64, 299.65, 252/299.7, 299.01; 70/356; 374/160, 161, 162; 116/216, 217

[56] References Cited

U.S. PATENT DOCUMENTS

| | | | |
|---|---|---|---|
| 4,077,260 | 3/1978 | Gray et al. | 252/299.66 |
| 4,137,192 | 1/1979 | Matsufuji | 252/299.5 |
| 4,140,016 | 2/1979 | Fergason | 252/299.67 |
| 4,149,413 | 4/1979 | Gray et al. | 252/299.67 |
| 4,167,489 | 9/1979 | Osman | 252/299.64 |
| 4,227,778 | 10/1980 | Raynes | 252/299.64 |

FOREIGN PATENT DOCUMENTS 2404040  4/1979  France ............ 252/299.64

OTHER PUBLICATIONS

Weissflog, W. et al., Mol. Cryst. Liq. Cryst., vol. 56 (Letters), pp. 295-301 (1980).
Hardquin, F. et al., Mol. Cryst. Liq. Cryst., vol. 56 (Letters), pp. 35-41 (1979).
Tinh, N. et al., Mol. Cryst. Liq. Cryst., vol. 56 (Letters), pp. 257-262 (1980).
Tinh, N. et al., Mol. Cryst. Liq. Cryst., vol. 56 (Letters), pp. 323-330 (1980).
Tinh, N. et al., Mol. Cryst. Liq. Cryst., vol. 72 (Letters), pp. 195-199 (1982).

*Primary Examiner*—Teddy S. Gron
*Attorney, Agent, or Firm*—Oblon, Fisher, Spivak, McClelland & Maier

[57] ABSTRACT

Cholesteric liquid crystals of the so-called reentrant mesogenic type obtained by mixing a substance such as a cholesterol ester having molecules of the "chiral" type with a liquid crystal of the so-called reentrant nematic type such as a substance corresponding to the general formula:

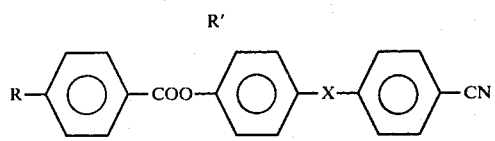

where R is an alkyl or alkoxy or alkylcarbonate group with:

$R' = H$ or $CH_3$ and X is an organic radical such that $CH=N$, $CH=CH$, $C\equiv C$ or $COO$.

The use of a liquid crystal in accordance with the invention serves to obtain a temperature-detecting device in which, in contrast to conventional cholesteric devices, the reflected light changes from blue to red when the temperature rises.

7 Claims, 3 Drawing Figures

CHOLESTERIC LIQUID CRYSTAL OF THE REENTRANT TYPE AND A TEMPERATURE-DETECTING DEVICE ENTAILING THE USE OF A LIQUID CRYSTAL OF THIS TYPE

Liquid crystals designated as "reentrant mesogenic crystals" are already known and exist in at least three mesophases such that a mesophase of a first type is located on each side of a mesophase of a second type. This is the case with the "reentrant nematic" liquid crystals which undergo changes of phase in the following sequence: solid-nematic-smectic-nematic-isotropic liquid as a function of increasing temperatures.

Also known are the cholesteric liquid crystals containing substances such that the molecule has a so-called "chiral" structure which extends substantially in one plane but with very different elongations in different directions starting from the central region of the molecule. The optical properties of these liquid crystals are variable as a function of temperature and may be employed for temperature detection.

The invention relates to a new family of cholesteric liquid crystals of the reentrant type. A first aim of the invention consists in extending the group of liquid crystals which are suitable for temperature detection. A second aim of the invention is to obtain further possibilities in the field of colorimetric indication over a number of different temperature ranges.

Thus if consideration is given to a known cholesteric liquid crystal such as, for example, a cholesterol ester corresponding to the formula:

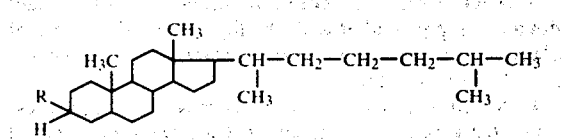

where R represents a radical of an element or a compound body, the cholesteric mesophase exhibits on the one hand an arrangement in parallel planes and on the other hand an arrangement in columns, in which the chiral molecules of the different planes are disposed in a helical arrangement. In fact, the directions of maximum elongations of the molecules of successive planes rotate through angles which are substantially proportional to the distance between two successive planes. The pitch of the helix thus formed depends on the composition of the substance and on the temperature.

It is found that, in reflected light, color changes occur by reason of the fact that the mean reflected-light wavelength is related to the pitch of the helix and therefore to the temperature of the medium in the case of a given liquid crystal.

In devices which make use of known cholesterics, a temperature rise in fact causes a change in color of the reflected light from red to blue. This constitutes a drawback since a desirable feature of a device having the intended function of warning the user that a predetermined temperature has been overstepped would be to provide a warning signal by means of a color change from blue to red and not from red to blue.

The present invention overcomes the disadvantage just mentioned.

The liquid crystal according to the invention contains at least one cholesteric crystal and is distinguished by the fact that it also contains a second liquid crystal of the reentrant nematic type.

According to another distinctive feature of the invention, the reentrant nematic liquid crystal corresponds to the general formula:

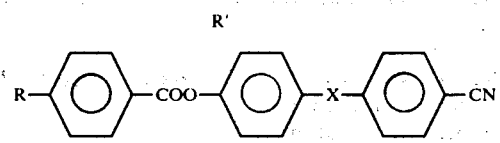

where:

$R = C_nH_{2n+1}$ or $C_nH_{2n+1}O$ or $C_{2n+1}COO$ with n within the range of 2 to 10;

$R' = H$ or $CH_3$ and where X is an organic radical such that:
$CH=N$
$CH=CH$
$C\equiv C$
$COO$ According to further distinctive features of the invention, the cholesteric liquid crystal is:

either a cholesterol ester such as an alkylcarboxylate, a chloride or a carbonate;

or a substance corresponding to the formula:

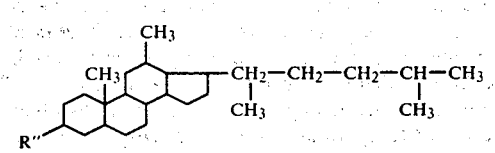

where R" is an alkyl having n carbon atoms (where n is within the range of 1 to 10);

or a cyanobiphenyl derivative such as the substance corresponding to the general formula:

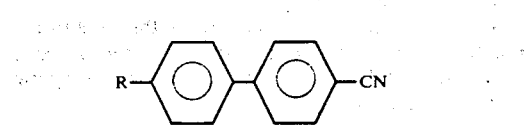

where R is an alkyl, an alkoxy or an alkylcarbonate.

Other features of the invention will be more apparent to those skilled in the art upon consideration of the following description and accompanying drawings, wherein.

Figure 1:
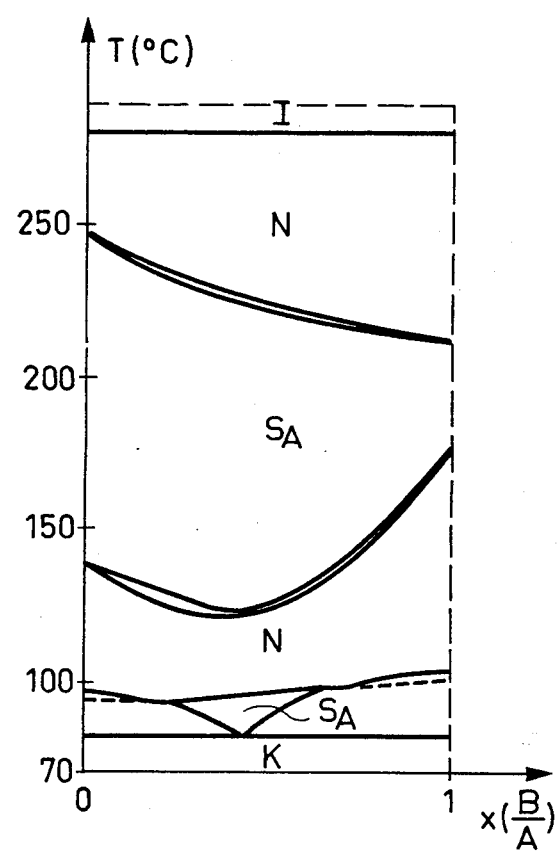
FIG. 1 is a phase diagram of a reentrant nematic which is a mixture having a variable composition and made up of two constituents.

In order to illustrate the properties of a mixture of liquid crystals of the "reentrant nematic" type, there is shown in FIG. 1 an isobaric phase diagram which gives the transition temperatures in degrees Centigrade (above 70° C.) of the different phases as a function of the ratio B/A of two constituents of this type. These constituents are:

A: 4-octyloxybenzoyloxy-4'-cyanostilbene;

B: p-hydroxybenzoyloxycyanostilbene nonanoate.

It is apparent that at least two N (nematic) phases located on each side of a phase $S_A$ (smectic-A phase) are present between the phases K (solid crystal phase) and I (isotropic liquid phase).

Figure 2:
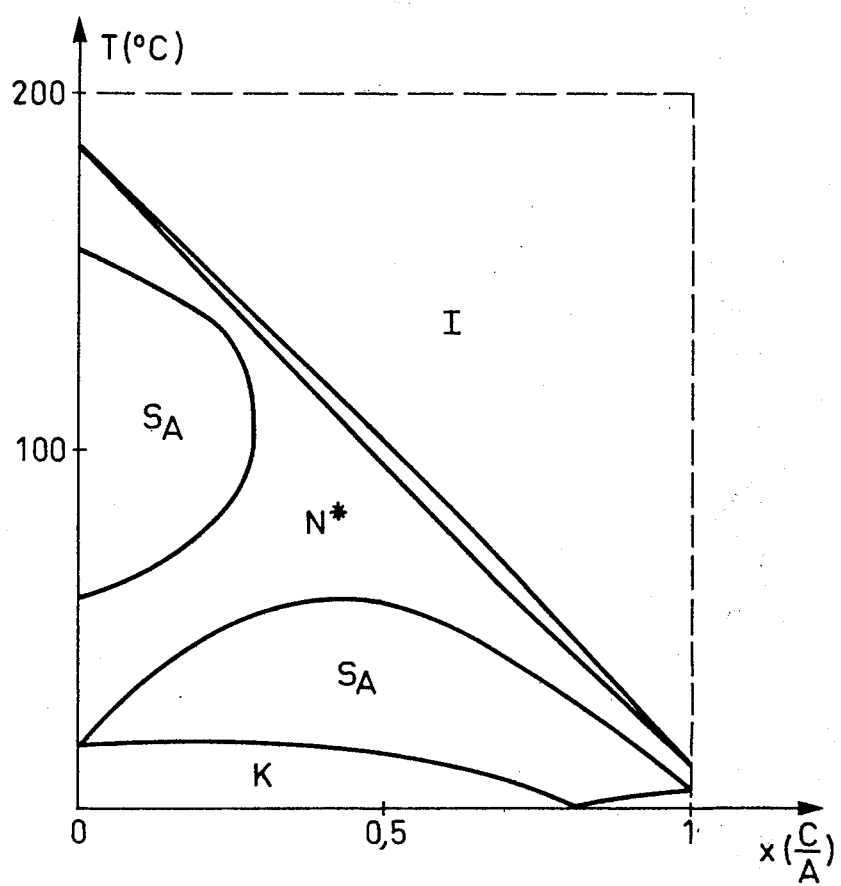
FIG. 2 is a similar diagram in the case of a liquid crystal according to the invention.

Similarly, in the case contemplated by the invention, there is shown in FIG. 2 an isobaric phase diagram of a liquid crystal obtained by mixing a cholesteric liquid crystal C with the liquid crystal A mentioned earlier in a ratio:

x = C/A within the range of 0 to 1, where the constituent C has the following designation:

C: cholesteryl-4-decanoate.

It is found that, in the case of a ratio x within the range of 5 to 20%, for example, there is observed at least one cholesteric phase N* located between two smectic ($S_A$) phases in accordance with the diagram:

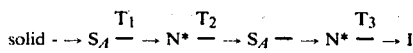

where $T_1$, $T_2$, $T_3$ are the transition temperatures between mesophases.

Figure 3:
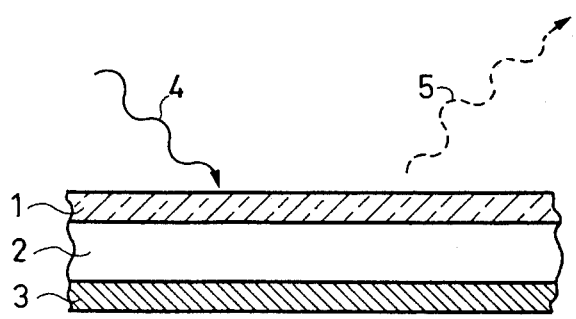
FIG. 3 is a diagram of a device which makes use of a liquid crystal according to the invention.

The diagrammatic sectional view of FIG. 3 shows a portion of a temperature-detecting device having the following structure:

A liquid crystal 2 according to the invention is placed between a transparent plate 1 and a light-absorbing plate 2. By way of example, the plate 1 can be a sheet of polyester and the plate 3 can be a plastic sheet containing a substantial charge of carbon powder (lampblack).

A light radiation 4 produces a reflected light 5 in which certain wavelengths are selectively absorbed as a function of temperature, thus producing color changes which serve to detect temperature variations.

Now in the case of a liquid crystal according to the invention, a reversal of the order of succession of colors is observed. In fact, the reflected wavelengths increase with the temperature. The device therefore reflects a red light when the temperature rises.

This constitutes an advantage of the invention inasmuch as users are accustomed to seeing a red color rather than a blue color for indicating temperatures which are too high.

We claim:

1. A liquid crystal mixture of at least one liquid crystal of a first type and a second liquid crystal of a second type, said first liquid crystal being a cholesteric material selected from the group consisting of cholesterol ester, a cyanobiphenyl derivative and a compound of the formula:

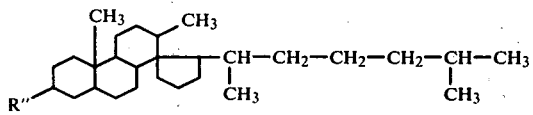

wherein R" is alkyl of 1 to 10 carbon atoms; said second liquid crystal having reentrant nematic properties in that it exists in at least three meso phases and having the formula:

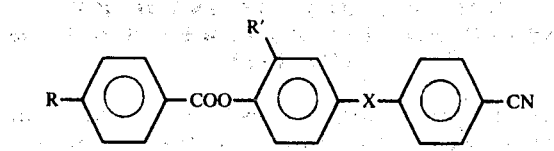

wherein R is $C_nH_{2n+1}$, $C_nH_{2n+1}O$ or $C_nH_{2n+1}COO$ and n ranges from 2 to 10, R' is hydrogen or methyl, and wherein X is —CH=N—, —CH=CH—, —C≡C— or —COO—; the proportion of said first and second liquid crystals being such that said mixture is of the reentrant cholesteric type.

2. The liquid crystal mixture of claim 1, wherein said cholesterol ester is an alkylcarboxylate, a chloride or a carbonate.

3. The liquid crystal mixture of claim 1, wherein said cyanobiphenyl compound is of the formula:

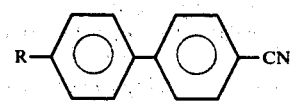

wherein R is a chiral alkyl, alkoxy or alkylcarbonate group.

4. The liquid crystal mixture of claim 1, wherein said first liquid crystal is cholesteryl-4-decanoate and wherein said second liquid crystal is 4-octyloxybenzoyloxy-4'-cyanostilbene.

5. A temperature detecting liquid crystal device, said device being provided with the liquid crystal mixture of claim 1 between the transparent plate and light-absorbing plate of said device.

6. A liquid crystal mixture of at least one liquid crystal material of a first type and at least one liquid crystal of a second type, said first liquid crystal material being selected from the group consisting of cholesterol ester, a cyanobiphenyl compound or a compound of the formula:

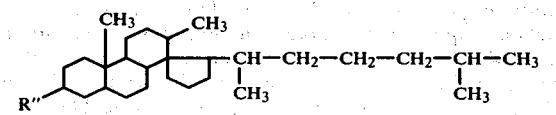

wherein R" is alkyl of 1 to 10 carbon atoms; said second liquid crystal being 4-octyloxybenzoyloxy-4'-cyanostilbene; the proportion of said first and second liquid crystal materials being such that said mixture is of the reentrant cholesteric type.

7. The liquid crystal mixture of claim 5, wherein said second liquid crystal having reentrant nematic properties is p-hydroxybenzoyloxycyanostilbene nonanoate.

* * * * *